(12) United States Patent
Hsieh

(10) Patent No.: US 11,128,219 B1
(45) Date of Patent: Sep. 21, 2021

(54) CONTROL CIRCUIT FOR VOLTAGE GENERATOR

(71) Applicant: NOVATEK Microelectronics Corp., Hsin-Chu (TW)

(72) Inventor: Chun-Yu Hsieh, Miaoli County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/882,569

(22) Filed: May 25, 2020

(51) Int. Cl.
```
H02M 3/158      (2006.01)
H02M 3/07       (2006.01)
G09G 3/36       (2006.01)
H02M 1/00       (2006.01)
```

(52) U.S. Cl.
CPC ........ H02M 3/1584 (2013.01); G09G 3/3696 (2013.01); H02M 3/07 (2013.01); H02M 1/0003 (2021.05); H02M 1/009 (2021.05); H02M 3/071 (2021.05)

(58) Field of Classification Search
None
See application file for complete search history.

(56) References Cited

U.S. PATENT DOCUMENTS

| | | | |
|---|---|---|---|
| 7,382,176 B2* | 6/2008 | Ayres | H02M 3/073 327/536 |
| 10,020,735 B2* | 7/2018 | Le Men | H02M 3/1582 |
| 10,084,376 B2* | 9/2018 | Lofthouse | H02M 3/155 |

* cited by examiner

*Primary Examiner* — Jeffery S Zweizig
(74) *Attorney, Agent, or Firm* — Winston Hsu

(57) ABSTRACT

A control circuit for at least one voltage generator includes a first transistor, a first controller, a second transistor, a second controller and a communicator. The first transistor is coupled to a first output terminal of the at least one voltage generator. The first controller is coupled to a control terminal of the first transistor. The second transistor is coupled to a second output terminal of the at least one voltage generator. The second controller is coupled to a control terminal of the second transistor. The communicator, coupled between the first controller and the second controller, is configured to selectively control the first controller and the second controller to communicate with each other or not according to the at least one voltage generator.

14 Claims, 16 Drawing Sheets

CONTROL CIRCUIT FOR VOLTAGE GENERATOR

BACKGROUND OF THE INVENTION

1. Field of the Invention

The present invention relates to a control circuit for at least one voltage generator, and more particularly, to a control circuit for at least one voltage generator configured to supply voltages to a display panel.

2. Description of the Prior Art

A liquid crystal display (LCD) panel usually requires a stable positive voltage and a stable negative voltage for its operations. The positive voltage is usually supplied from a buck converter, boost converter or positive charge pump (PCP). The negative voltage is usually supplied from an inverting buck-boost converter or negative charge pump (NCP). Different types of voltage generators may be applied based on the size and/or resolution of the panel. For example, a panel with larger size and/or higher resolution may be accompanied by larger loading, and a boost converter and an inverting buck-boost converter may be applied to deal with the large loading of the panel.

In general, different types of voltage generators have different control circuits, and thus it is necessary to deploy a dedicated control circuit for a voltage generator. However, there is no control circuit applicable to various types of voltage generators used for different display panels.

SUMMARY OF THE INVENTION

It is therefore an objective of the present invention to provide a novel control circuit, which is applicable to any voltage generators for a display panel. The control circuit may operate in different modes to be applied to different types of voltage generators.

An embodiment of the present invention discloses a control circuit for at least one voltage generator. The control circuit includes a first transistor, a first controller, a second transistor, a second controller and a communicator. The first transistor is coupled to a first output terminal of the at least one voltage generator. The first controller is coupled to a control terminal of the first transistor. The second transistor is coupled to a second output terminal of the at least one voltage generator. The second controller is coupled to a control terminal of the second transistor. The communicator, coupled between the first controller and the second controller, is configured to selectively control the first controller and the second controller to communicate with each other or not according to the at least one voltage generator.

These and other objectives of the present invention will no doubt become obvious to those of ordinary skill in the art after reading the following detailed description of the preferred embodiment that is illustrated in the various figures and drawings.

DETAILED DESCRIPTION

Figure 1B:
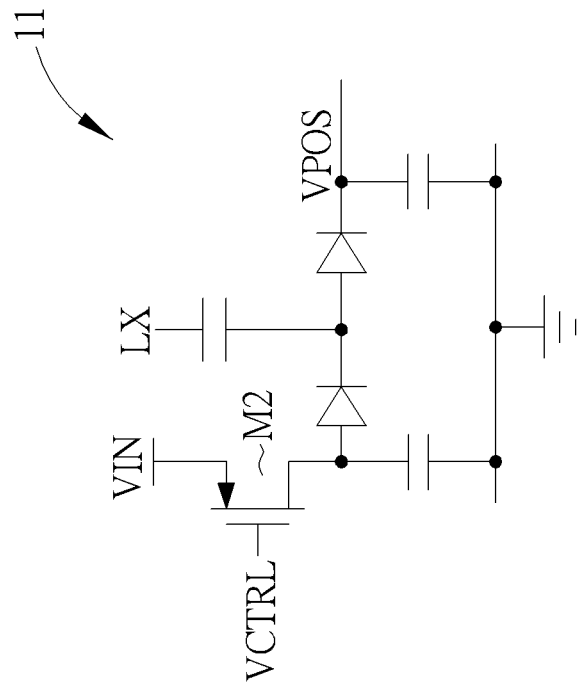
FIGS. 1A and 1B are schematic diagrams of an NCP and a PCP, respectively.
Figure 1A:
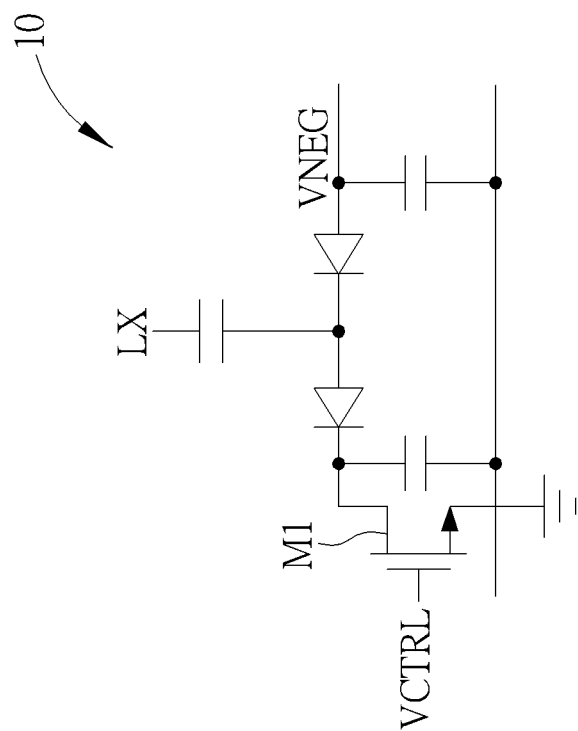

Please refer to FIGS. 1A and 1B, which are schematic diagrams of a negative charge pump (NCP) 10 and a positive charge pump (PCP) 11, respectively. As shown in FIG. 1A, the NCP 10, which may generate a negative output voltage VNEG by receiving an oscillation signal LX and a control signal VCTRL, is composed of an N-type metal oxide semiconductor (NMOS) transistor M1 and several capacitors and diodes. The output voltage VNEG is generated based on the swing of the oscillation signal LX. The control signal VCTRL may control the on-resistance of the NMOS transistor M1, to regulate the output voltage VNEG.

As shown in FIG. 1B, the PCP 11, which may generate a positive output voltage VPOS by receiving an input voltage VIN, an oscillation signal LX and a control signal VCTRL, is composed of a P-type metal oxide semiconductor (PMOS) transistor M2 and several capacitors and diodes. The output voltage VPOS is generated based on the level of the input voltage VIN and the swing of the oscillation signal LX. The control signal VCTRL may control the on-resistance of the PMOS transistor M2, to regulate the output voltage VPOS.

Figure 2B:
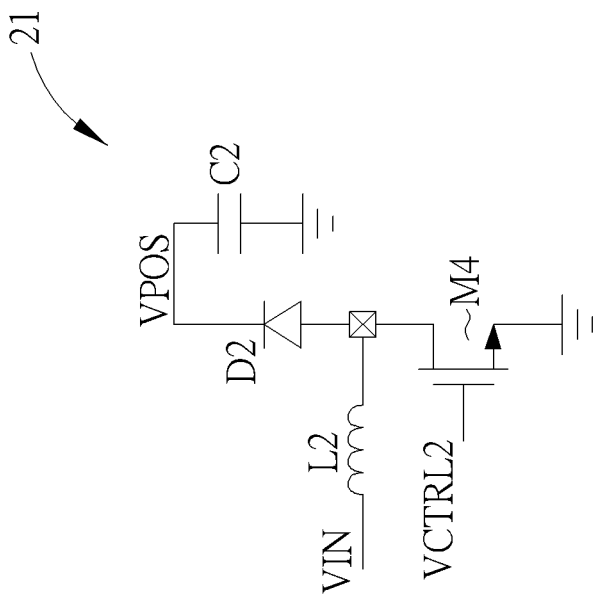
FIGS. 2A and 2B are schematic diagrams of an inverting buck-boost converter and a boost converter, respectively.
Figure 2A:
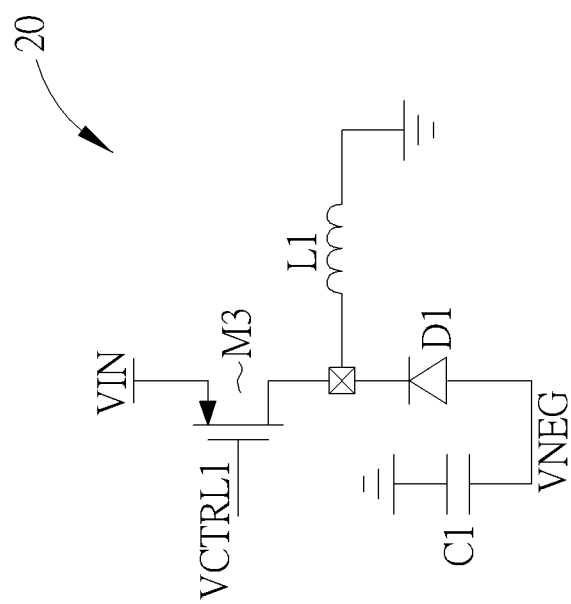

Please refer to FIGS. 2A and 2B, which are schematic diagrams of an inverting buck-boost converter 20 and a boost converter 21, respectively. As shown in FIG. 2A, the inverting buck-boost converter 20, which may generate a negative output voltage VNEG by receiving an input voltage VIN and a control signal VCTRL1, is composed of a PMOS transistor M3, an inductor L1, a diode D1 and a capacitor C1. The control signal VCTRL1 may control the PMOS transistor M3 to be switched on and off. This switching operation may charge the inductor L1 in the on phase, and allow the energies to be forwarded to the output terminal in the off phase, so as to generate and regulate the negative output voltage VNEG.

As shown in FIG. 2B, the boost converter 21, which may generate a positive output voltage VPOS by receiving an input voltage VIN and a control signal VCTRL2, is composed of an NMOS transistor M4, an inductor L2, a diode D2 and a capacitor C2. The control signal VCTRL2 may control the NMOS transistor M4 to be switched on and off. This switching operation may charge the inductor L2 in the on phase, and allow the energies to be forwarded to the output terminal in the off phase, so as to generate and regulate the positive output voltage VPOS.

In general, the inverting buck-boost converter 20 and the boost converter 21 are usually applied to output the negative output voltage VNEG and the positive output voltage VPOS, respectively, when the output load is heavy, and the NCP 10 and the PCP 11 are usually applied to output the negative output voltage VNEG and the positive output voltage VPOS, respectively, when the output load is light. In order to provide the positive voltage output and negative voltage output, a single inductor multiple output (SIMO) regulator may also be feasible. The SIMO regulator may supply multiple output voltages with the usage of only one inductor, which reduces the bill of materials (BOM) cost of the system.

Figure 3:
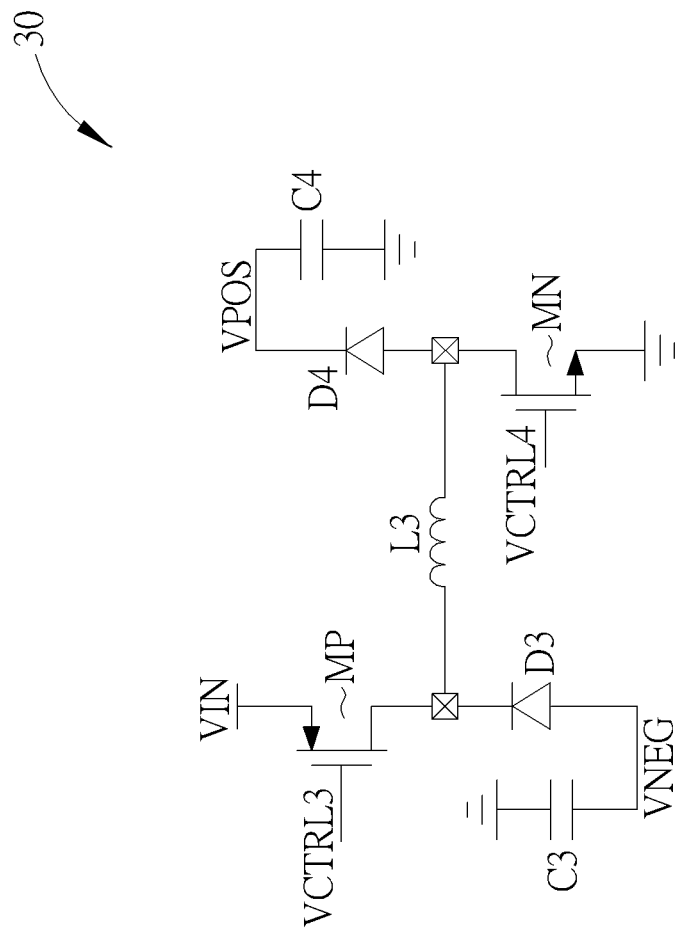
FIG. 3 is a schematic diagram of a SIMO regulator.

Please refer to FIG. 3, which is a schematic diagram of a SIMO regulator 30. As shown in FIG. 3, the SIMO regulator 30 includes an NMOS transistor MN, a PMOS transistor MP, an inductor L3, diodes D3 and D4, and capacitors C3 and C4. The SIMO regulator 30 has two output terminals, respectively configured to output a negative output voltage VNEG and a positive output voltage VPOS based on reception of the input voltage VIN and controls of the control signals VCTRL3 and VCTRL4. Similar to the inverting buck-boost converter 20 or the boost converter 21, the SIMO regulator 30 also operates by controlling the PMOS transistor MP and the NMOS transistor MN to be switched on and off.

Please note that the SIMO regulator 30 is usually used for light load applications. This is because the inductor L3 of the SIMO regulator 30 has to pass output currents to both the positive output terminal and the negative output terminal, and the double currents may easily cause overheating. Also, the control mechanism for the SIMO regulator 30 is quite complex such that a heavy load application may be a great challenge for the stability issue of the SIMO regulator 30.

As for light load applications, the SIMO regulator 30 may be more preferable than the NCP 10 and the PCP 11 due to several reasons. For example, the output voltage of a charge pump may be limited to the level of the input signal VIN and swing of the oscillation signal LX, and the oscillation signal LX may easily affect other wires or functional modules on the circuit board due to coupling of parasitic capacitors. Also, the NCP 10 and the PCP 11 may generate a higher BOM cost due to the usage of a great number of diodes.

As for heavy load applications, the inverting buck-boost converter 20 and the boost converter 21 may be more preferable than the SIMO regulator 30 due to higher efficiency and lower temperature. Also, the inverting buck-boost converter 20 and the boost converter 21 may be controlled independently without interventions. However, the combination of the inverting buck-boost converter 20 and the boost converter 21 requires one more inductor, resulting in a higher BOM cost.

Figure 4:
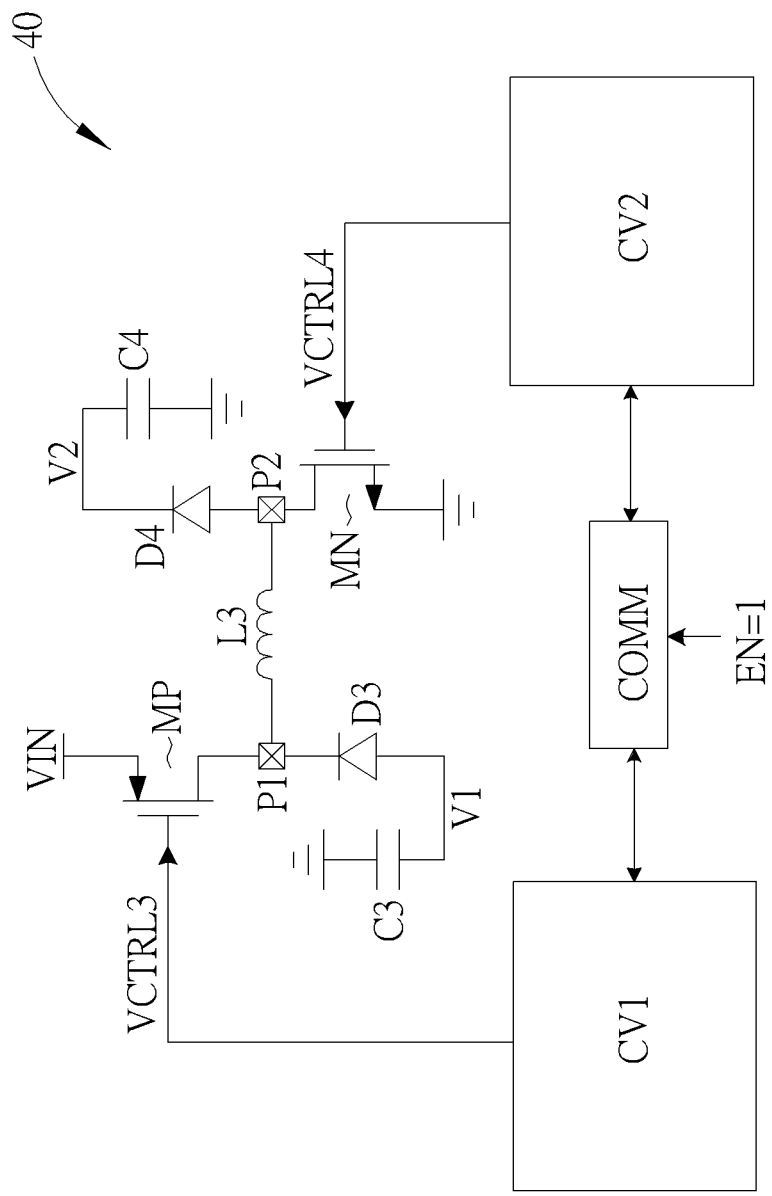
FIG. 4 illustrates a SIMO regulator and its control circuit according to an embodiment of the present invention.

In order to satisfy light-load and heavy-load applications of display panel and also gain the benefits of various voltage generators and regulators, the present invention provides a control circuit for the voltage generator(s). FIG. 4 illustrates a SIMO regulator 40 and its control circuit according to an embodiment of the present invention. As shown in FIG. 4, the SIMO regulator 40 is similar to the SIMO regulator 30, so signals and elements having similar functions are denoted by the same symbols. The SIMO regulator 40 may further include two controllers CV1 and CV2. The SIMO regulator 40 may generate output voltages V1 and V2 based on controls of the controllers CV1 and CV2. More specifically, the controller CV1 is coupled to a control terminal (e.g., the gate terminal) of the PMOS transistor MP, for outputting the control signal VCTRL3 to the PMOS transistor MP. The controller CV2 is coupled to a control terminal (e.g., the gate terminal) of the NMOS transistor MN, for outputting the control signal VCTRL4 to the NMOS transistor MN. A communicator COMM, which may be included in the SIMO regulator 40 or may be a circuit block independent of the SIMO regulator 40, is coupled between the controller CV1 and the controller CV2. The communicator COMM may selectively control the controllers CV1 and CV2 to communicate with each other or not. In this embodiment, the controllers CV1 and CV2 are allowed to communicate with each other since the controllers CV1 and CV2 are commonly used to control the SIMO regulator 40.

In an embodiment, the control circuit for controlling the SIMO regulator 40 may include the controllers CV1 and CV2, the transistors MP and MN, and the communicator COMM, which may be implemented as an integrated circuit (IC) in a chip. Other circuit devices such as the inductor L3, the diodes D3 and D4, and the capacitor C3 and C4 may be off-chip devices implemented on the circuit board such as a printed circuit board (PCB) or flexible printed circuit board (FPC). The chip may include input/output (I/O) pads P1 and P2, which are served as connection nodes coupled to these circuit devices. Note that the transistors MP and MN may also be regarded as circuit devices included in the SIMO regulator 40, as the circuit structure shown in FIG. 3.

More specifically, the PMOS transistor MP may be coupled to the inductor L3 through the I/O pad P1, and coupled to the negative output terminal that outputs the output voltage V1 through the I/O pad P1 and the diode D3. The NMOS transistor MN may be coupled to the inductor L3 through the I/O pad P2, and coupled to the positive output terminal that outputs the output voltage V2 through the I/O pad P2 and the diode D4. In this embodiment, the output voltage V1 may be a negative output voltage, and the output voltage V2 may be a positive output voltage.

As mentioned above, the communicator COMM may selectively control the controllers CV1 and CV2 to communicate with each other or not. This may be achieved by receiving a communication enable signal EN. In other words, the communication enable signal EN may instruct the communicator COMM to control the controllers CV1 and CV2 to communicate with each other or not. In the embodiment shown in FIG. 4, since the controllers CV1 and CV2 are used for the SIMO regulator 40, it is necessary that the controllers CV1 and CV2 should communicate with each other, to let the SIMO regulator 40 to operate normally.

Figures 5A, 5B:
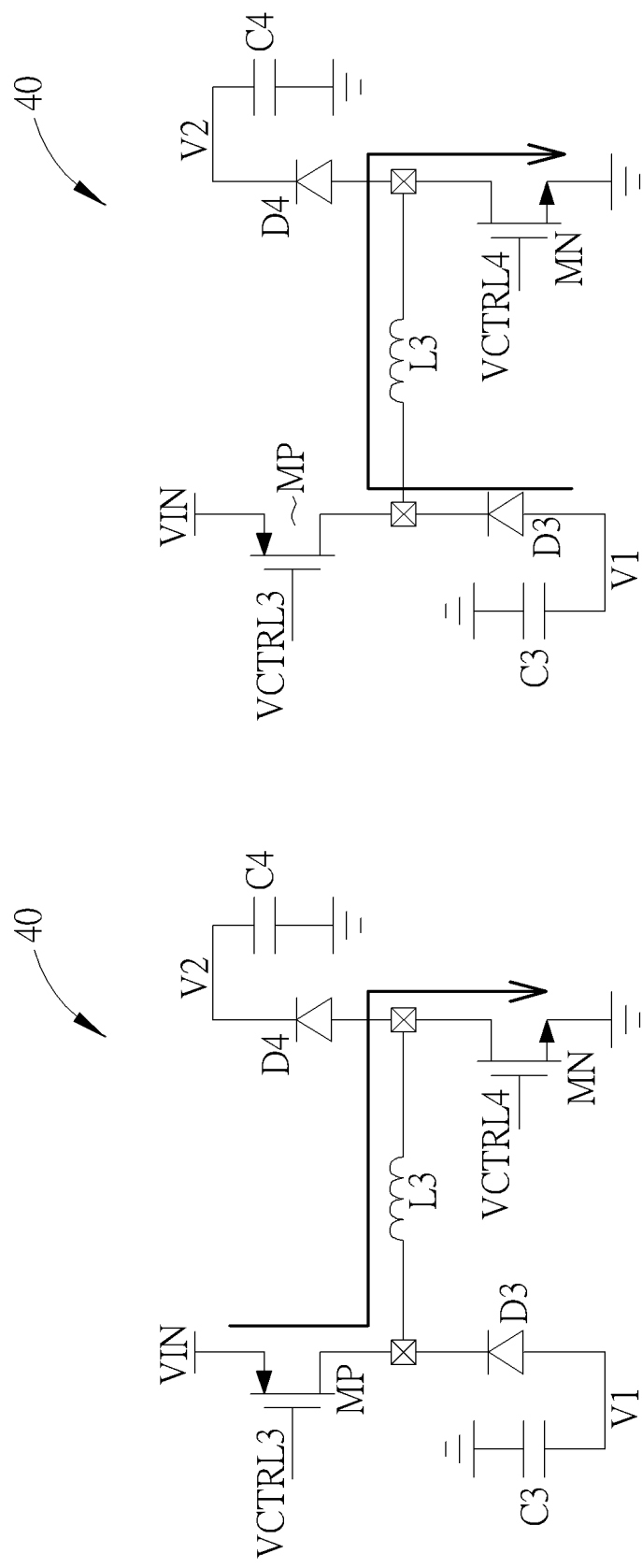
FIGS. 5A-5D illustrate different operational statuses of the SIMO regulator.
Figure 5C:
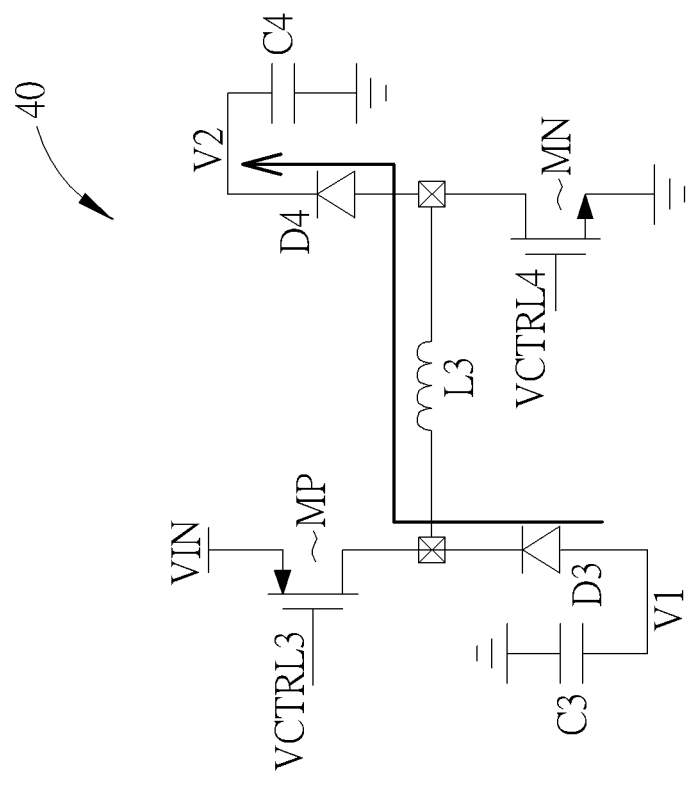
Figure 5D:
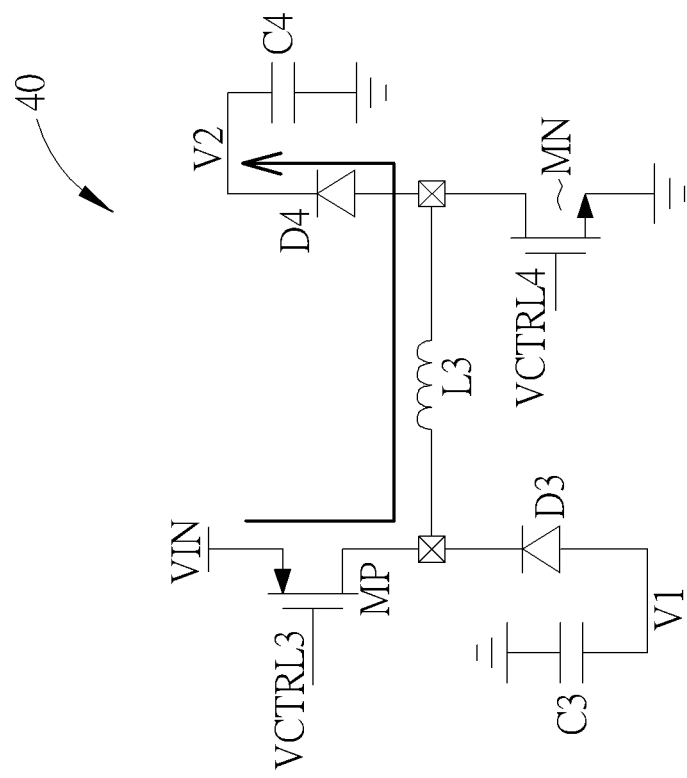

Please refer to FIGS. 5A-5D, which illustrate different operational statuses of the SIMO regulator 40. As mentioned above, the PMOS transistor MP and the NMOS transistor MN may be switched on and off to realize the operations of the SIMO regulator 40, and FIGS. 5A-5D illustrate several possible operational statuses (where the controllers CV1 and CV2 and the communicator COMM are omitted herein for brevity). As shown in FIG. 5A, when both of the PMOS transistor MP and the NMOS transistor MN are turned on, the current may pass through the PMOS transistor MP and the NMOS transistor MN, to charge the inductor L3. As shown in FIG. 5B, when the PMOS transistor is turned off and the NMOS transistor MN is turned on, the current may flow from the negative output terminal to the ground terminal through the diode D3, the inductor L3 and the NMOS transistor MN, so that the energies carried on the inductor L3 may be forwarded to the negative output terminal. As shown in FIG. 5C, when the PMOS transistor MP is turned on and the NMOS transistor MN is turned off, the current may flow from the input terminal (that receives the input voltage VIN) to the positive output terminal through the PMOS transistor MP, the inductor L3 and the diode D4, so that the energies carried on the inductor L3 may be forwarded to the positive output terminal. As shown in FIG. 5D, when both of the PMOS transistor and the NMOS transistor are turned off, the current may flow from the negative output terminal to the positive output terminal through the diode D3, the inductor L3 and the diode D4, so that the energies carried on the inductor L3 may be forwarded to both the negative output terminal and the positive output terminal.

The SIMO regulator 40 may supply the negative output voltage V1 and the positive output voltage V2 based on combination of the abovementioned operational statuses. FIG. 5A illustrates an operational status where the inductor L3 is charged by an input current, as could be regarded as a "charging phase". FIG. 5B illustrates an operational status where the energies of the inductor L3 are forwarded to the negative output terminal for outputting the negative output voltage V1, as could be regarded as a "negative output phase". FIG. 5C illustrates an operational status where the energies of the inductor L3 are forwarded to the positive output terminal for outputting the positive output voltage V2, as could be regarded as a "positive output phase". FIG. 5D illustrates an operational status where the energies of the inductor L3 are forwarded to both the negative output terminal and the positive output terminal, as could be regarded as a "bilateral output phase".

Figure 6A:
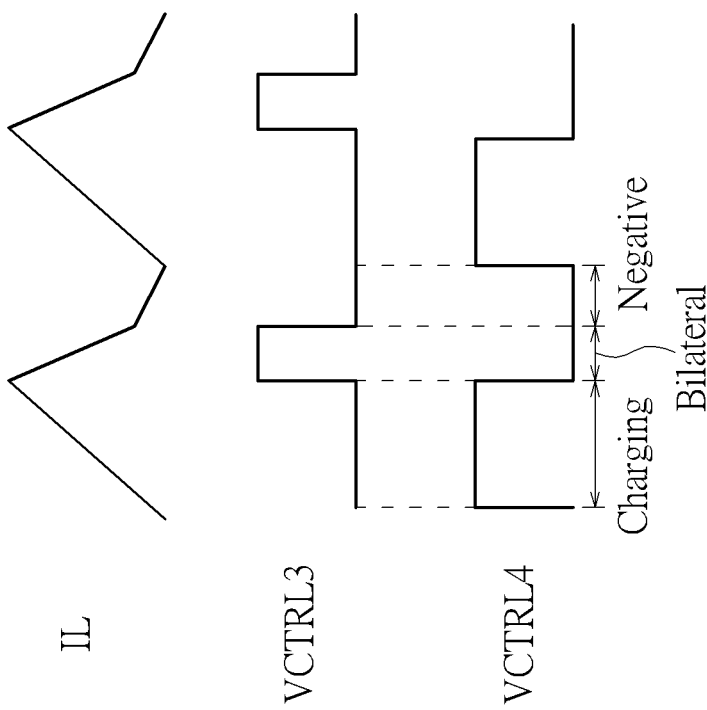
FIGS. 6A and 6B are waveform diagrams of the operations of the SIMO regulator.

Therefore, the controllers CV1 and CV2 may output the control signals VCTRL3 and VCTRL4 to control the PMOS transistor MP and the NMOS transistor MN and thereby control the operational statuses/phases of the SIMO regulator 40 according to the loads of the negative and positive output terminals of the SIMO regulator 40. In an embodiment, if the load of the negative output terminal is greater than the load of the positive output terminal, the operational statuses/phases of the SIMO regulator 40 may be configured to be in an order of charging phase, negative output phase and bilateral output phase, or in an order of charging phase, bilateral output phase and negative output phase. Please refer to FIGS. 6A and 6B, which are waveform diagrams of the operations of the SIMO regulator 40. FIG. 6A illustrates that the charging phase, bilateral output phase and negative output phase run in turn. As shown in FIG. 6A, the inductor current IL increases when the inductor L3 is charged in the charging phase, and decreases when energies are supplied to the negative and positive output terminals. Since the negative output terminal has a greater load, the bilateral output phase and the negative output phase are implemented, allowing more power to be supplied to the negative output terminal (i.e., supplied in both the bilateral output phase and the negative output phase) and less power to be supplied to the positive output terminal (i.e., supplied in the bilateral output phase only).

Figure 6B:
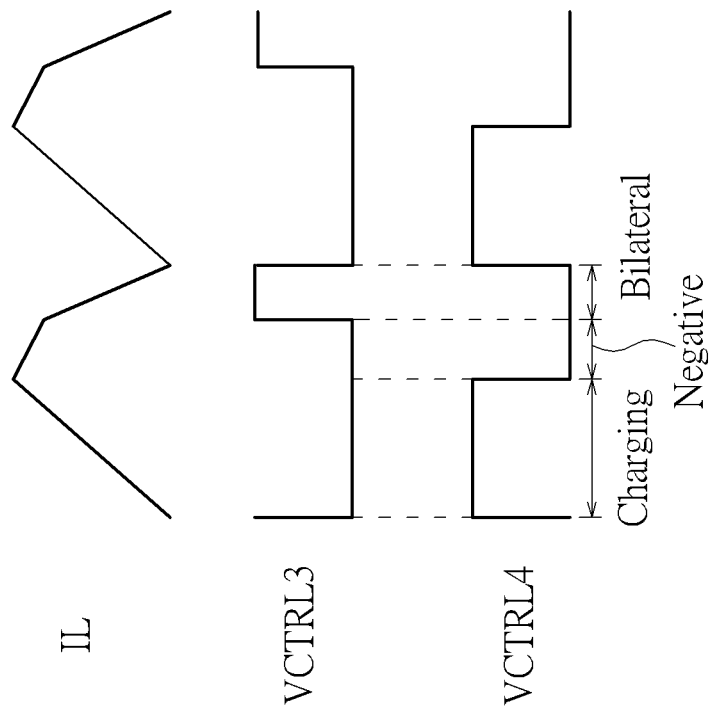

FIG. 6B illustrates that the charging phase, negative output phase and bilateral output phase run in turn. This implementation may also realize that more power will be supplied to the negative output terminal and less power will be supplied to the positive output terminal, to be adapted to the situation where the load of the negative output terminal is greater than the load of the positive output terminal.

On the other hand, if the load of the positive output terminal is greater than the load of the negative output terminal, the operational statuses/phases of the SIMO regulator 40 may be configured to be in an order of charging phase, positive output phase and bilateral output phase, or in an order of charging phase, bilateral output phase and positive output phase. These two implementations may realize that more power will be supplied to the positive output terminal and less power will be supplied to the negative output terminal. The detailed operations can be derived by referring to the above descriptions, and will not be narrated herein.

In an embodiment, if the load of the positive output terminal is identical to the load of the negative output terminal, the operational statuses/phases of the SIMO regulator 40 may be configured to be in an order of charging phase, negative output phase, charging phase and positive output phase, and so on. Since the appearance frequency of the negative output phase is equal to the appearance frequency of the positive output phase, the power supplied to the negative output terminal will be substantially equal to the power supplied to the positive output terminal, to be adapted to the loading situation.

Please note that, according to the present invention, the allocations and combinations of the operational statuses should not be limited to those described above. For example, the length or ratio of each phase may be adjusted according to system requirements, where the output terminal having a higher load is allowed to receive more energy under the allocations of the operational statuses. As long as the charging phase is included, any other combinations or implementations of operational status are feasible to be adapted to various loading situations.

In such a situation, the controllers CV1 and CV2 may output the control signals VCTRL3 and VCTRL4 to the PMOS transistor MP and the NMOS transistor MN, respectively, based on communication between the controllers CV1 and CV2 under the control of the communicator COMM. In detail, in order to realize a specific operational status shown in any of FIGS. 5A-5D, the controller CV1 should output the control signal VCTRL3 to the PMOS transistor MP based on a negotiation with the communicator COMM and/or the controller CV2, and the controller CV2 should output the control signal VCTRL4 to the NMOS transistor MN based on a negotiation with the communicator COMM and/or the controller CV1. Based on the communication and/or negotiation, the controller CV1 may determine the duty cycle and frequency of controlling the PMOS transistor MP to be turned on or off, and the controller CV2 may determine the duty cycle and frequency of controlling the NMOS transistor MN to be turned on or off.

Figure 7:
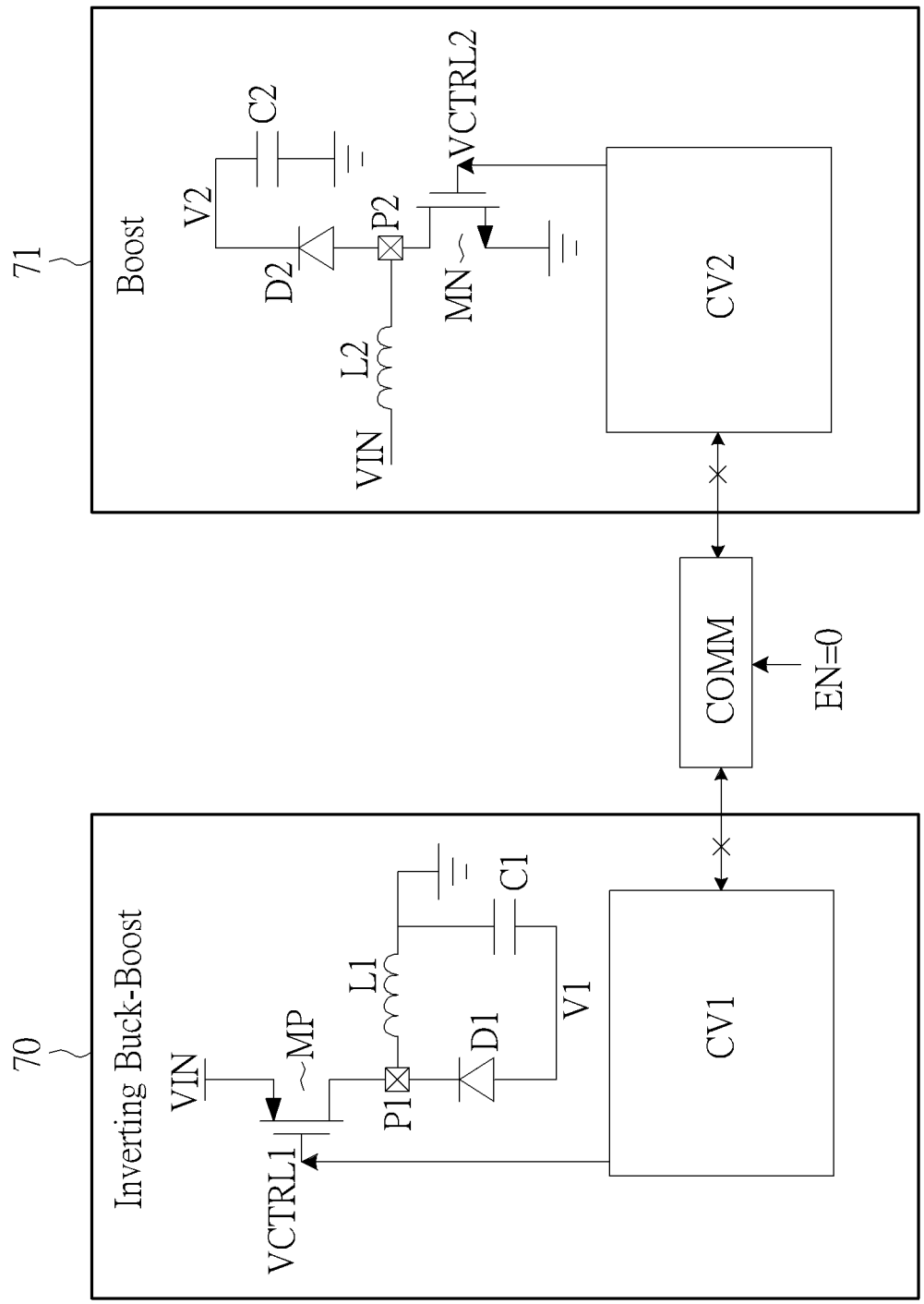
FIG. 7 is a schematic diagram of an inverting buck-boost converter and a boost converter and their control circuit according to an embodiment of the present invention.

In the above embodiment, the implemented voltage generator is a SIMO regulator. In another embodiment, the implemented voltage generator may include an inverting buck-boost converter and a boost converter. Please refer to FIG. 7, which is a schematic diagram of an inverting buck-boost converter 70 and a boost converter 71 and their control circuit according to an embodiment of the present invention. As shown in FIG. 7, the inverting buck-boost converter 70 is similar to the inverting buck-boost converter 20 shown in FIG. 2A, and the boost converter 71 is similar to the boost converter 21 shown in FIG. 2B, so signals and elements having similar functions are denoted by the same symbols. In this embodiment, the inverting buck-boost converter 70 is configured to generate the negative output voltage V1, and the boost converter 71 is configured to generate the positive output voltage V2. It is known that the implementation of the inverting buck-boost converter 70 and the boost converter 71 is more preferable in heavy-load applications.

As mentioned above, the controllers CV1 and CV2, the transistors MP and MN, and the communicator COMM may be implemented as a control circuit such as an IC included in a chip, and other circuit devices are off-chip devices implemented on the circuit board. Therefore, the control circuit for the SIMO regulator 40 may be applicable to other types of voltage generators such as the inverting buck-boost converter 70 and/or the boost converter 71 if the devices on the circuit board are deployed correspondingly. This is easily realized by replacing or adjusting the off-chip devices without changing the IC. In this embodiment, the communicator COMM may control the controllers CV1 and CV2 to not communicate with each other, e.g., isolate the controllers CV1 and CV2, and/or cut off the connection between the controllers CV1 and CV2.

In addition, according to the embodiments of the present invention, the communicator COMM may selectively control the controllers CV1 and CV2 to communicate with each other or not by receiving the communication enable signal EN. In this embodiment, since the controllers CV1 and CV2 are used for the inverting buck-boost converter 70 and the boost converter 71, respectively, the communication enable signal EN may instruct the communicator COMM to control the controllers CV1 and CV2 to not communicate with each other. For example, please refer to FIG. 4 and FIG. 7. When the control circuit is used for the SIMO regulator 40, the communication enable signal EN may equal "1", which controls the controllers CV1 and CV2 to communicate with each other during the operations. When the control circuit is used for two separate voltage generators such as the inverting buck-boost converter 70 and the boost converter 71, the communication enable signal EN may equal "0", which controls the controllers CV1 and CV2 to not communicate with each other during the operations. In such a situation, the controller CV1 may output the control signal VCTRL1 to the PMOS transistor MP irrespective of the operation of the controller CV2, and the controller CV2 may output the control signal VCTRL2 to the NMOS transistor MN irrespective of the operation of the controller CV1. For example, the PMOS transistor MP may be turned on or off with a specific delay without considering the status of the NMOS transistor MN.

As shown in FIG. 7, in the inverting buck-boost converter 70, the PMOS transistor MP may be coupled to the inductor L1 through the I/O pad P1, and coupled to the output terminal that outputs the negative output voltage V1 through the I/O pad P1 and the diode D1. The controller CV1 is configured to output the control signal VCTRL1 to the PMOS transistor MP, to control the operations of the inverting buck-boost converter 70. Note that the PMOS transistor MP may be considered as a component of the control circuit for controlling the inverting buck-boost converter 70, or may be considered as a circuit device included in the inverting buck-boost converter 70.

Figure 8B:
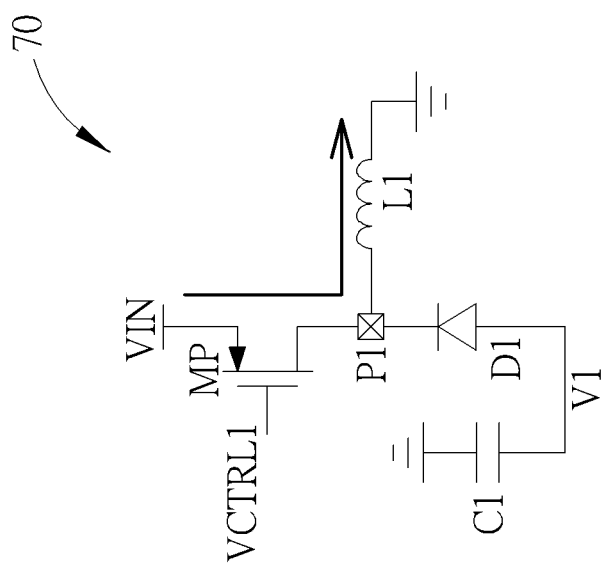
FIGS. 8A-8B illustrate different operational statuses of the inverting buck-boost converter.
Figure 8A:
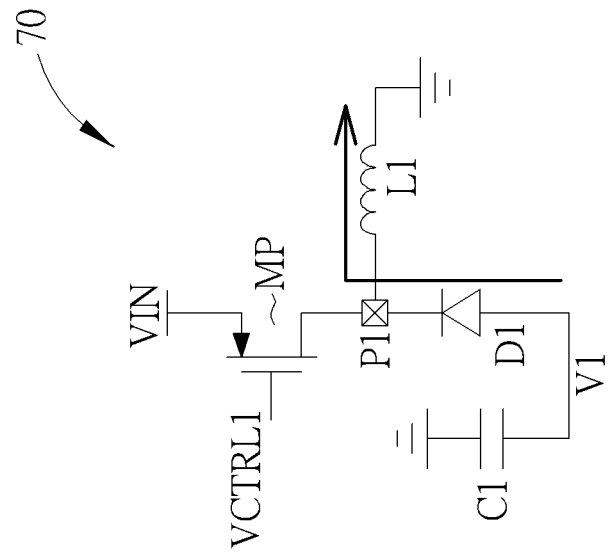

The detailed operations of the inverting buck-boost converter 70 are shown in FIGS. 8A-8B, which illustrate different operational statuses of the inverting buck-boost converter 70. Similarly, as for the inverting buck-boost converter 70, the PMOS transistor MP may also be switched on and off to realize its operations, and FIGS. 8A-8B illustrate several possible operational statuses (where the controllers CV1 and CV2 and the communicator COMM are omitted herein for brevity). As shown in FIG. 8A, when the PMOS transistor MP is turned on, the current may pass through the PMOS transistor MP to charge the inductor L1. This is an operational status where the inductor L1 is charged by an input current, as could be regarded as a "charging phase". As shown in FIG. 8B, when the PMOS transistor MP is turned off, the current may flow from the output terminal to the ground terminal through the diode D1 and the inductor L1, so that the energies carried on the inductor L1 may be forwarded to the output terminal. This is an operational status where the energies of the inductor L1 are forwarded to the output terminal for outputting the negative output voltage V1, as could be regarded as an "output phase".

Figure 9:
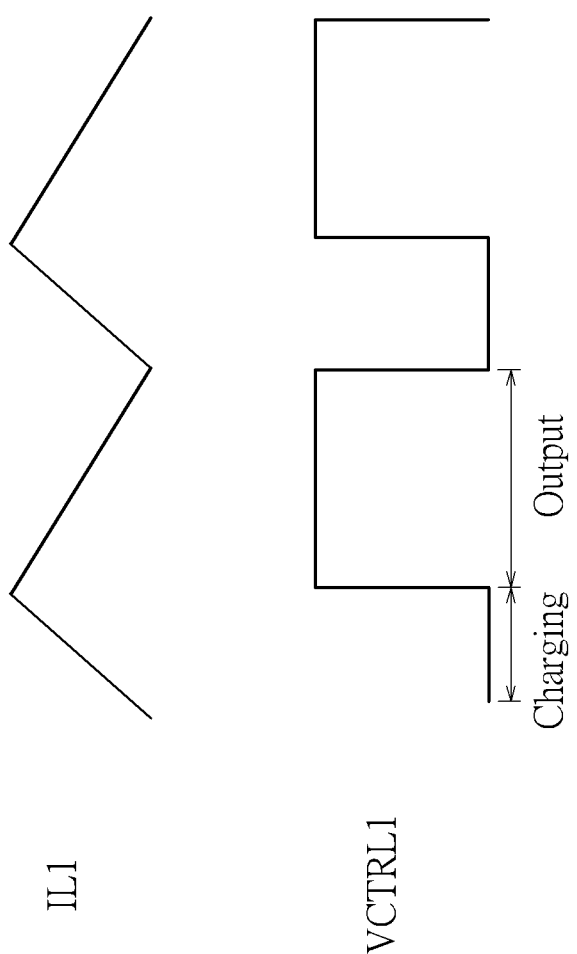
FIG. 9 is a waveform diagram of the operations of the inverting buck-boost converter.

Therefore, the inverting buck-boost converter 70 may operate by turning the PMOS transistor MP on and off, to be switched between the charging phase and the output phase alternately. Please refer to FIG. 9, which is a waveform diagram of the operations of the inverting buck-boost converter 70. FIG. 9 illustrates that the charging phase and the output phase run alternately. As shown in FIG. 9, the inductor current IL1 increases when the inductor L1 is charged in the charging phase, and decreases when energies are supplied to the output terminal.

Please continue to refer to FIG. 7. In the boost converter 71, the NMOS transistor MN may be coupled to the inductor L2 through the I/O pad P2, and coupled to the output terminal that outputs the positive output voltage V2 through the I/O pad P2 and the diode D2. The controller CV2 is configured to output the control signal VCTRL2 to the NMOS transistor MN, to control the operations of the boost converter 71. Note that the NMOS transistor MN may be considered as a component of the control circuit for controlling the boost converter 71, or may be considered as a circuit device included in the boost converter 71.

Figures 10A, 10B:
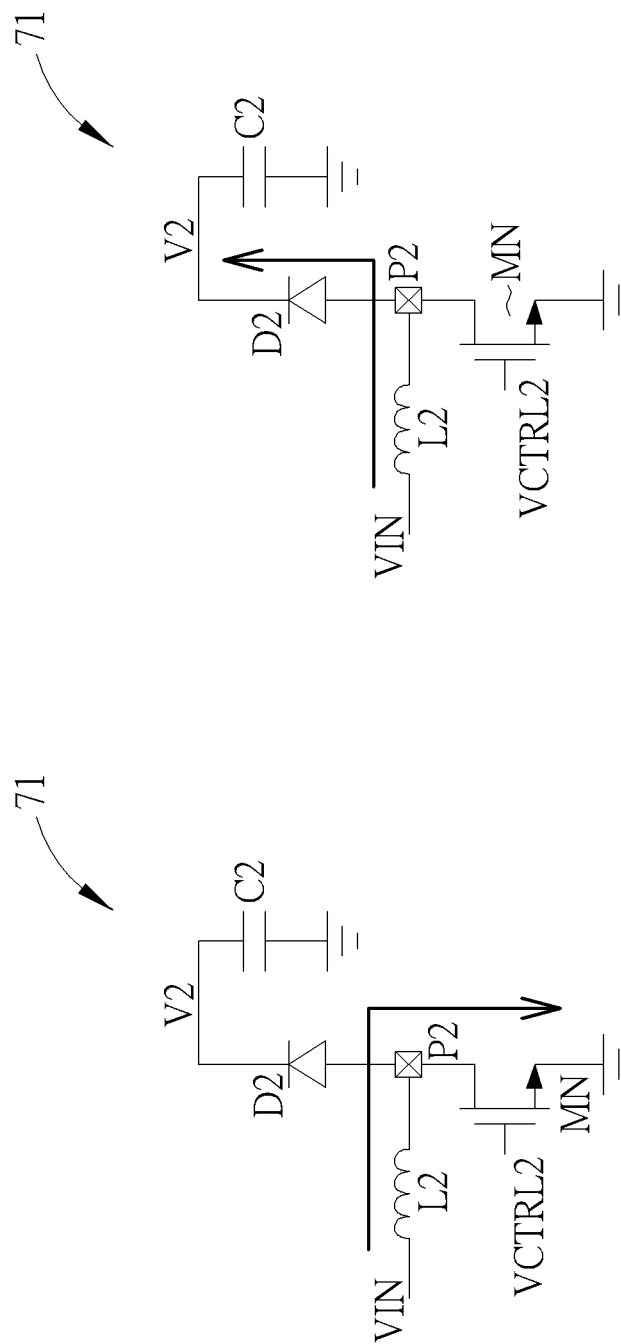
FIGS. 10A-10B illustrate different operational statuses of the boost converter.

The detailed operations of the boost converter 71 are shown in FIGS. 10A-10B, which illustrate different operational statuses of the boost converter 71. Similarly, as for the boost converter 71, the NMOS transistor MN may also be switched on and off to realize its operations, and FIGS. 10A-10B illustrate several possible operational statuses (where the controllers CV1 and CV2 and the communicator COMM are omitted herein for brevity). As shown in FIG. 10A, when the NMOS transistor MN is turned on, the current may pass through the NMOS transistor MN to charge the inductor L2. This is an operational status where the inductor L2 is charged by an input current, as could be regarded as a "charging phase". As shown in FIG. 10B, when the NMOS transistor MN is turned off, the current may flow from the input terminal (that receives the input voltage VIN) to the output terminal through the inductor L2 and the diode D2, so that the energies carried on the inductor L2 may be forwarded to the output terminal. This is an operational status where the energies of the inductor L2 are forwarded to the output terminal for outputting the positive output voltage V2, as could be regarded as an "output phase".

Figure 11:
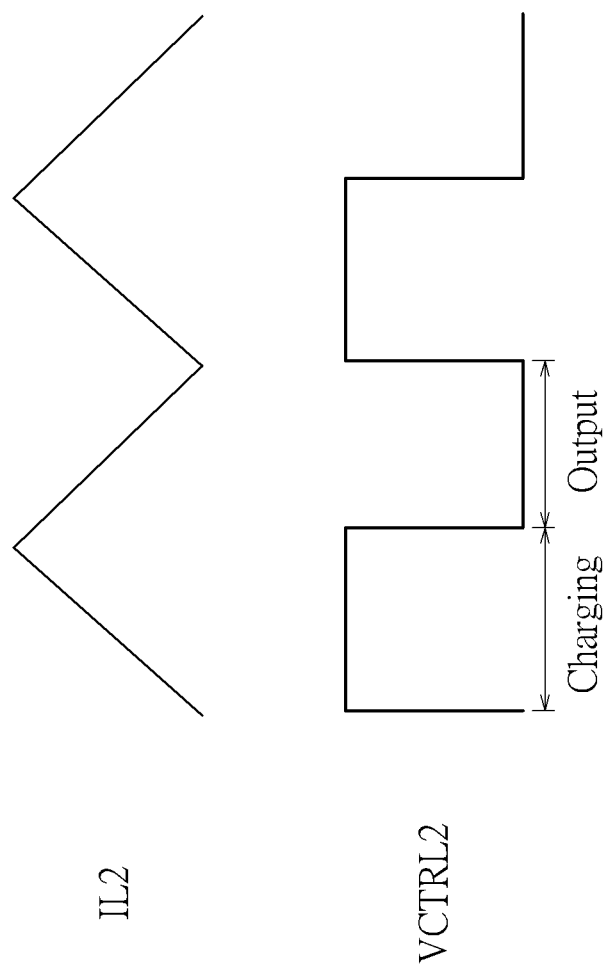
FIG. 11 is a waveform diagram of the operations of the boost converter.

Therefore, the boost converter 71 may operate by turning the NMOS transistor MN on and off, to be switched between the charging phase and the output phase alternately. Please refer to FIG. 11, which is a waveform diagram of the operations of the boost converter 71. FIG. 11 illustrates that the charging phase and the output phase run alternately. As shown in FIG. 11, the inductor current IL2 increases when the inductor L2 is charged in the charging phase, and decreases when energies are supplied to the output terminal.

In such a situation, in the embodiment as shown in FIG. 7, the communicator COMM may control the controllers CV1 and CV2 to not communicate with each other. As a result, the inverting buck-boost converter 70 and the boost converter 71 may be controlled independent of each other. In other words, the controller CV1 may control the inverting buck-boost converter 70 without intervention of the controller CV2, and the controller CV2 may control the boost converter 71 without intervention of the controller CV1.

Figure 12:
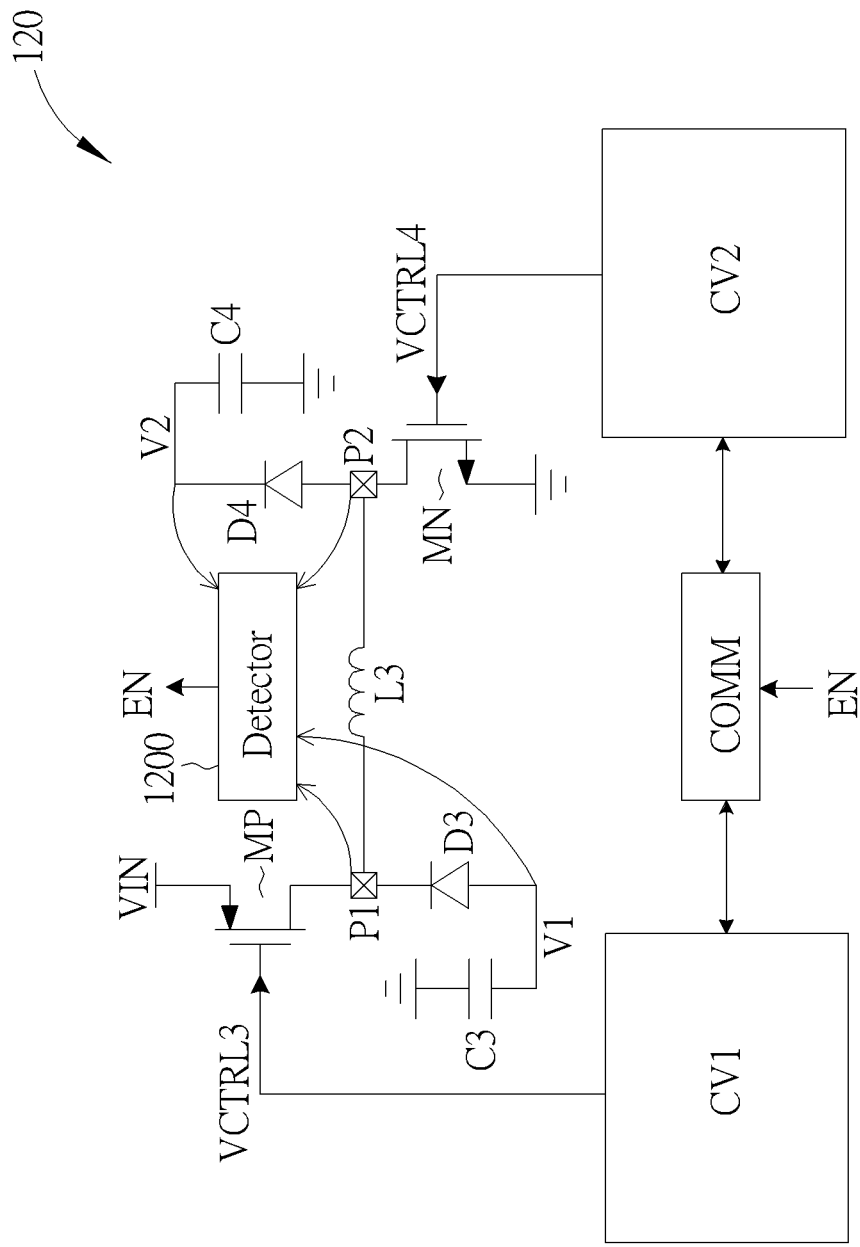
FIG. 12 is a schematic diagram of another SIMO regulator and its control circuit according to an embodiment of the present invention.
Figure 13:
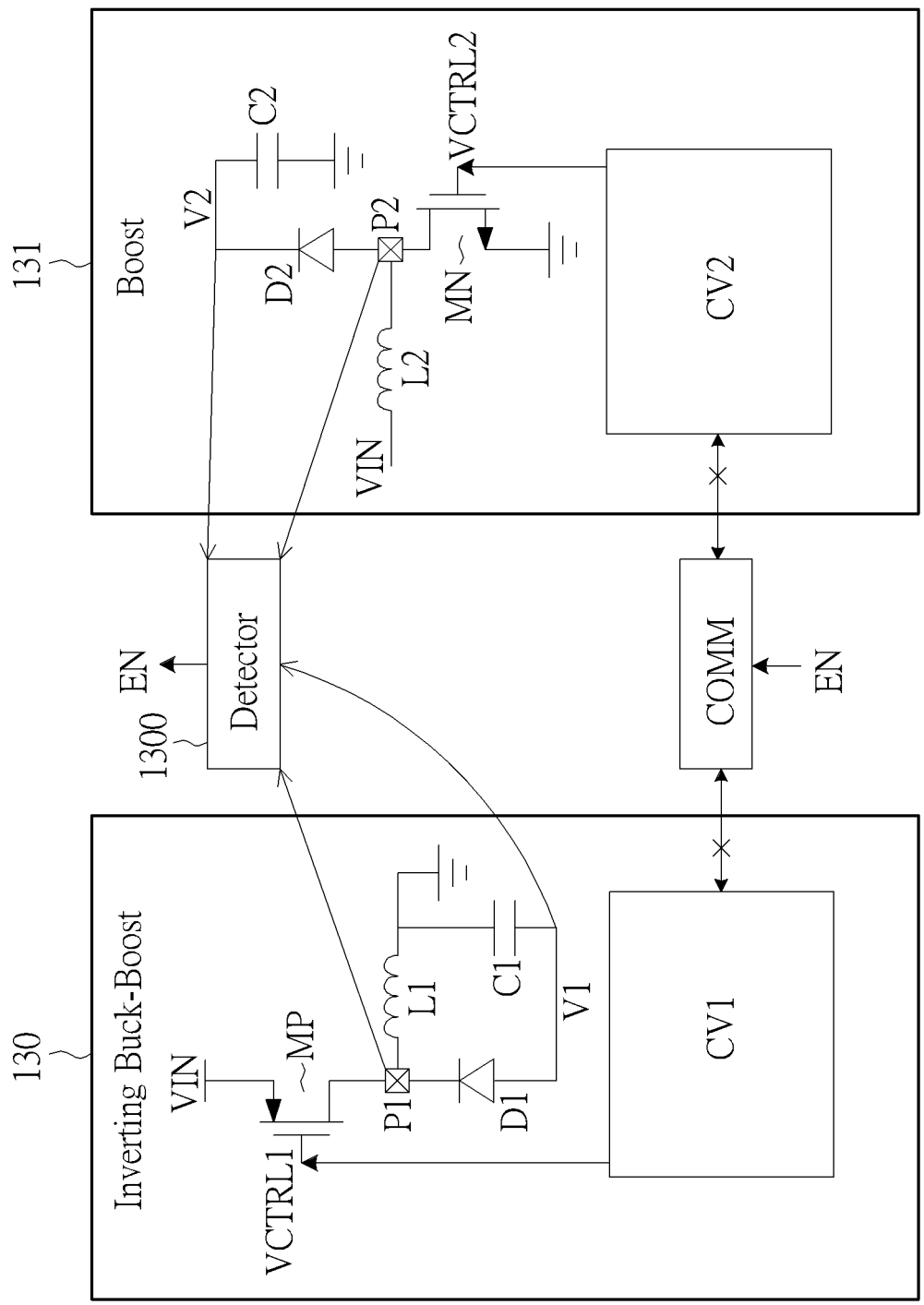
FIG. 13 illustrates that the control circuit for an inverting buck-boost converter and a boost converter further includes a detector.

Please refer to FIG. 12, which is a schematic diagram of another SIMO regulator 120 and its control circuit according to an embodiment of the present invention. The structure of the SIMO regulator 120 and its control circuit are similar to the structure of the SIMO regulator 40 and its control circuit, so signals and elements having similar functions are denoted by the same symbols. The main difference therebetween is that, the control circuit for the SIMO regulator 120 further includes a detector 1200 coupled to the SIMO regulator 120. Similarly, FIG. 13 illustrates that the control circuit for an inverting buck-boost converter 130 and a boost converter 131 further includes a detector 1300 coupled to the inverting buck-boost converter 130 and the boost converter 131.

The detectors 1200 and 1300 may be configured to detect the voltage generator(s), in order to determine whether the voltage generator includes only one regulator such as the SIMO regulator 120 or includes two separate regulators such as the inverting buck-boost converter 130 and the boost converter 131. The detectors 1200 and 1300 may control the communicator COMM to selectively control the controllers CV1 and CV2 to communicate with each other or not according to the detection result. More specifically, the controllers CV1 and CV2 may be allowed to communicate with each other if the detector detects that there is a SIMO regulator commonly coupled to the I/O pads P1 and P2. The controllers CV1 and CV2 may be controlled to not communicate with each other if the detector detects that there are two different regulators respectively coupled to the I/O pads P1 and P2. In an embodiment, the detector 1200 or 1300 may output the communication enable signal EN to the communicator COMM, allowing the communicator COMM to selectively control the controllers CV1 and CV2 to communicate with each other or not.

The detector 1200 or 1300 may be realized in any manner. In an embodiment, the detector 1200 or 1300 may be coupled to the I/O pads P1 and P2 for detecting the voltage or current on the I/O pads P1 and P2. Alternatively or additionally, the detector 1200 or 1300 may be coupled to the negative output terminal and the positive output terminal of the voltage generator (s), to detect the voltage or current on the output terminals. In an exemplary embodiment, the detector 1200 or 1300 may be a current detector coupled to the I/O pads P1 and P2, for detecting the inductor current. The I/O pads P1 and P2 may be applied with the same appropriate voltage signal. If the voltage generator is a SIMO regulator as the structure shown in FIG. 12, the detector 1200 may detect that no current flowing between the I/O pads P1 and P2 (i.e., no current flowing through the inductor L3) since the two terminals of the inductor L3 have the same voltage level. Therefore, the detector 1200 may determine that the voltage generator deployed on the circuit board is a SIMO regulator. On the other hand, if the voltage generator includes two separate regulators such as an inverting buck-boost converter and a boost converter as the structure shown in FIG. 13, the detector 1300 may detect a current flowing through the I/O pads P1 and/or P2 (e.g., flowing through the inductors L1 and/or L2) while the same voltage signal is applied to the I/O pads P1 and P2. Therefore, the detector 1300 may determine that the voltage generator deployed on the circuit board includes two separate regulators. The detector 1200 or 1300 can thereby output the communication enable signal EN to the communicator COMM based on the detection result.

As a result, the control circuit of the present invention may be applied to various types of voltage generators, and thus the advantages of these voltage generators may be acquired. If the output loading is small, a SIMO regulator may be implemented, in order to achieve a lower BOM cost. In such a situation, the control circuit may be configured to be in an operation mode where two controllers are allowed to communicate with each other. If the output loading is large, an inverting buck-boost converter and a boost converter may be implemented, in order to support large loading. In such a situation, the control circuit may be configured to be in an operation mode where two controllers operate independently. The operations of the controllers may be controlled by a communicator, which allows the controllers to communicate with each other or not based on a communication enable signal. This communication enable signal may be received from an external control pin operated by a designer or operator, or may be received from a detector that can detect the circuit devices and structures on the circuit board. Therefore, the control circuit of the present invention may support different types of voltage generators under various loading situations, to be adapted to various applications such as large-scale panels and small-scale panels.

Please note that the embodiments of the present invention aim at providing a control circuit for adaptively controlling the voltage generator (s). Those skilled in the art may make modifications and alternations accordingly. For example, in the above embodiments, the controllers are configured to control MOS transistors to realize the operations of the SIMO regulator, the inverting buck-boost converter and the boost converter. In another embodiment, the MOS transistors may be replaced by bipolar junction transistors (BJTs) or any other devices that may be implemented as switches. In addition, in the above embodiments, the voltage generators are implemented as the SIMO regulator, the inverting buck-boost converter and the boost converter, and those skilled in the art should understand that the applied voltage generators are not limited thereto.

Figure 14:
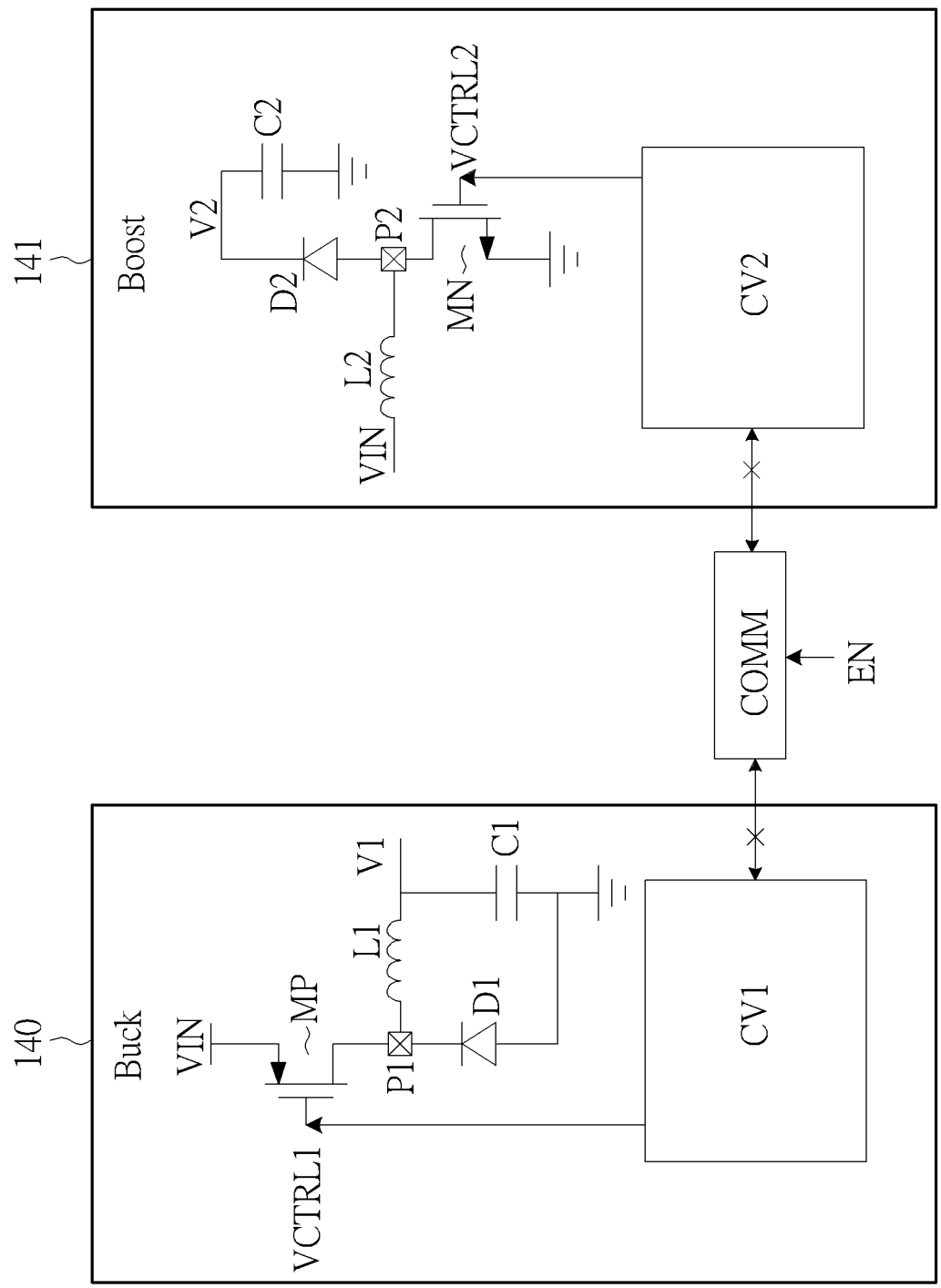
FIG. 14 is a schematic diagram of the control circuit applied to another voltage generator according to an embodiment of the present invention.

Please refer to FIG. 14, which is a schematic diagram of the control circuit applied to another voltage generator according to an embodiment of the present invention. As shown in FIG. 14, the voltage generators and their control circuit are similar to those shown in FIG. 7, so signals and elements having similar functions are denoted by the same symbols. FIG. 14 illustrates that the voltage generator includes a buck converter 140 and a boost converter 141. With the control of the communicator COMM, the same control circuit may also be applied to the combination of the buck converter 140 and the boost converter 141, where the PMOS transistor MP may be considered as a component of the buck converter 140 and the NMOS transistor MN may be considered as a component of the boost converter 141. The communication enable signal EN may indicate that the control circuit is used for two separate voltage generators, and thereby control the communicator COMM to cut off the connection and communication between the controllers CV1 and CV2; hence, the control of the buck converter 140 and the control of the boost converter 141 may be independent of each other.

Figure 15:
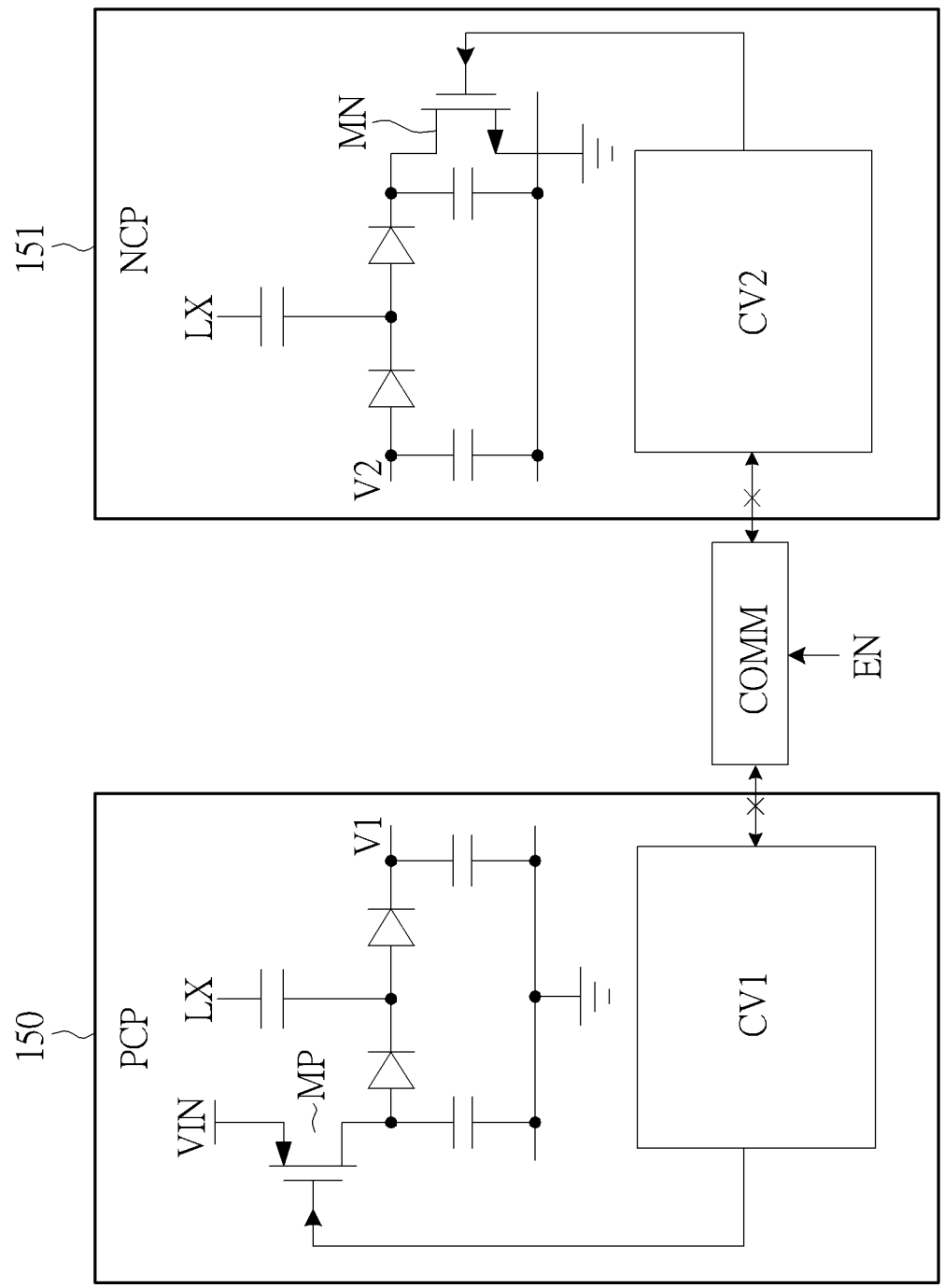
FIG. 15 is a schematic diagram of the control circuit applied to a further voltage generator according to an embodiment of the present invention.

Please refer to FIG. 15, which is a schematic diagram of the control circuit applied to a further voltage generator according to an embodiment of the present invention. As shown in FIG. 15, the voltage generators include a PCP 150 and an NCP 151 similar to those shown in FIGS. 1B and 1A, respectively. The controllers CV1 and CV2 are configured to control the PCP 150 and the NCP 151, respectively. Thus, with the control of the communicator COMM, the same control circuit may also be applied to the combination of the PCP 150 and the NCP 151, where the PMOS transistor MP may be considered as a component of the PCP and the NMOS transistor MN may be considered as a component of the NCP. The communication enable signal EN may indicate that the control circuit is used for two separate voltage generators, and thereby control the communicator COMM to cut off the connection and communication between the controllers CV1 and CV2; hence, the control of the PCP 150 and the control of the NCP 151 may be independent of each other.

Please note that the abovementioned detector for detecting the voltage generator(s) is also applicable to the embodiments shown in FIGS. 14 and 15. Based on the detection results, the detector may send the communication enable signal EN to the communicator COMM. The detailed operations of the detector are illustrated above and will not be narrated herein.

To sum up, the present invention may provide a control circuit applicable to various voltage generators and regulators fora display panel. The control circuit may operate in different modes to be applied to different types of voltage generators. The control circuit may include two controllers respectively coupled to two output terminals, and also include a communicator. The communicator is configured to selectively control the two controllers to communicate with each other or not according to the implemented voltage generator(s). In an embodiment, the control circuit may include a detector, which detects the implemented voltage generator(s) and thereby sends a communication enable signal to the communicator. Alternatively or additionally, the communication enable signal may be generated from an external control pin. If the control circuit is applied to a SIMO regulator, the communicator may control the two controllers to operate based on communication between the controllers, so as to control the SIMO regulator appropriately. If the control circuit is applied to two separate voltage generators, the communicator may control the two controllers to operate without communication and invention, e.g., the connection between the controllers may be cut off. The two separate voltage generators may be a combination of any types of regulators such as an inverting buck-boost converter and a boost converter, a buck converter and a boost converter, or a PCP and an NCP. Thus, the control circuit can support different types of voltage generators under various loading situations, to be adapted to various applications such as large-scale panels and small-scale panels.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit for at least one voltage generator, comprising:
 a first transistor, coupled to a first output terminal of the at least one voltage generator;
 a first controller, coupled to a control terminal of the first transistor;
 a second transistor, coupled to a second output terminal of the at least one voltage generator;
 a second controller, coupled to a control terminal of the second transistor; and
 a communicator, coupled between the first controller and the second controller, configured to selectively control the first controller and the second controller to communicate with each other or not according to the at least one voltage generator.

2. The control circuit of claim 1, wherein the at least one voltage generator comprises a single inductor multiple output (SIMO) regulator, and the first transistor and the second transistor are comprised in the SIMO regulator.

3. The control circuit of claim 2, wherein the SIMO regulator comprises the first output terminal and the second output terminal, and the first controller and the second controller are configured to control the first transistor and the second transistor, respectively, according to a load of the first output terminal and a load of the second output terminal.

4. The control circuit of claim 1, wherein the at least one voltage generator comprises an inverting buck-boost converter and a boost converter, and the first transistor is comprised in the inverting buck-boost converter and the second transistor is comprised in the boost converter.

5. The control circuit of claim 4, wherein the first controller is configured to control the inverting buck-boost converter and the second controller is configured to control the boost converter, and the inverting buck-boost converter and the boost converter are controlled independent of each other.

6. The control circuit of claim 1, wherein the at least one voltage generator comprises a buck converter and a boost converter, and the first transistor is comprised in the buck converter and the second transistor is comprised in the boost converter.

7. The control circuit of claim 6, wherein the first controller is configured to control the buck converter and the second controller is configured to control the boost converter, and the buck converter and the boost converter are controlled independent of each other.

8. The control circuit of claim 1, wherein the at least one voltage generator comprises a positive charge pump (PCP) and a negative charge pump (NCP), and the first transistor is comprised in the PCP and the second transistor is comprised in the NCP.

9. The control circuit of claim 8, wherein the first controller is configured to control the PCP and the second controller is configured to control the NCP, and the PCP and the NCP are controlled independent of each other.

10. The control circuit of claim 1, wherein the communicator receives a communication enable signal, which instructs the communicator to control the first controller and the second controller to communicate with each other or not.

11. The control circuit of claim 10, further comprising:
 a detector, coupled to the at least one voltage generator, configured to detect the at least one voltage generator and correspondingly control the communicator to selectively control the first controller and the second controller to communicate with each other or not.

12. The control circuit of claim 11, wherein the detector is configured to output the communication enable signal to the communicator to control the communicator.

13. The control circuit of claim 1, wherein the first controller outputs a control signal to the first transistor based on a negotiation with the communicator or the second controller when the first controller and the second controller are controlled to communicate with each other.

14. The control circuit of claim 1, wherein the first controller outputs a control signal to the first transistor irrespective of an operation of the second controller when the first controller and the second controller are controlled to not communicate with each other.

\* \* \* \* \*